(12) United States Patent
Cho et al.

(10) Patent No.: US 10,902,557 B2
(45) Date of Patent: Jan. 26, 2021

(54) METHOD AND APPARATUS FOR RESTORING IMAGE

(71) Applicant: SAMSUNG ELECTRONICS CO., LTD., Suwon-si (KR)

(72) Inventors: Yang Ho Cho, Seongnam-si (KR); Deokyoung Kang, Suwon-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 241 days.

(21) Appl. No.: 16/197,591

(22) Filed: Nov. 21, 2018

(65) Prior Publication Data

US 2019/0164255 A1 May 30, 2019

(30) Foreign Application Priority Data

Nov. 24, 2017 (KR) .......................... 10-2017-0158646

(51) Int. Cl.
*G06T 5/00* (2006.01)
*H04N 9/04* (2006.01)
(Continued)

(52) U.S. Cl.
CPC .............. *G06T 5/001* (2013.01); *G02B 7/021* (2013.01); *G02B 27/0955* (2013.01);
(Continued)

(58) Field of Classification Search
CPC ................ G06T 5/001; H04N 9/04557; H04N 5/22541; H04N 9/04515; H04N 5/23229;
(Continued)

(56) References Cited

U.S. PATENT DOCUMENTS

2005/0285952 A1\* 12/2005 Kwon ...................... H04N 5/20
348/234
2008/0030596 A1\* 2/2008 Sung .................. H04N 9/04515
348/224.1
(Continued)

FOREIGN PATENT DOCUMENTS

EP 1873713 A2 1/2008
JP 4905326 B2 3/2012
(Continued)

OTHER PUBLICATIONS

Communication dated Apr. 5, 2019, from the European Patent Office in counterpart European Application No. 18207752.9.

*Primary Examiner* — Lewis G West
(74) *Attorney, Agent, or Firm* — Sughrue Mion, PLLC

(57) ABSTRACT

Provided is a method and apparatus for restoring an image, the apparatus including a plurality of lenses configured to pass a plurality of rays, a sensor including a target sensing element configured to receive a target ray passing a first lens among the plurality of lenses, and a second sensing element configured to receive a second ray passing a second lens among the plurality of lenses, the first lens being different from the second lens, and a processor configured to determine the second sensing element based on a difference between a direction of the target ray and a direction of the second ray, and to restore color information corresponding to the target sensing element based on color information detected by the second sensing element.

23 Claims, 11 Drawing Sheets

(51) Int. Cl.
- *H04N 5/225* (2006.01)
- *G02B 7/02* (2006.01)
- *G02B 27/09* (2006.01)
- *H04N 5/232* (2006.01)
- *H04N 13/257* (2018.01)
- *H04N 13/232* (2018.01)
- *H04N 13/15* (2018.01)

(52) U.S. Cl.
CPC ..... *H04N 5/22541* (2018.08); *H04N 5/23229* (2013.01); *H04N 9/04515* (2018.08); *H04N 9/04557* (2018.08); *H04N 13/15* (2018.05); *H04N 13/232* (2018.05); *H04N 13/257* (2018.05)

(58) Field of Classification Search
CPC .... H04N 13/257; H04N 13/232; H04N 13/15; G02B 7/021; G02B 27/0955
See application file for complete search history.

(56) References Cited

U.S. PATENT DOCUMENTS

| | | | |
|---|---|---|---|
| 2009/0153745 A1* | 6/2009 | Park | H04N 17/002 348/708 |
| 2011/0285879 A1* | 11/2011 | Hatakeyama | H04N 9/646 348/241 |
| 2012/0188409 A1 | 7/2012 | Gallagher et al. | |
| 2014/0169671 A1* | 6/2014 | Choi | H04N 9/0451 382/167 |
| 2014/0184755 A1 | 7/2014 | Shibazaki et al. | |
| 2014/0369601 A1* | 12/2014 | Lee | G06T 5/001 382/167 |
| 2015/0228061 A1* | 8/2015 | Shin | G06T 5/50 382/167 |
| 2018/0152692 A1 | 5/2018 | Cho et al. | |
| 2019/0034731 A1 | 1/2019 | Lee et al. | |
| 2019/0082168 A1 | 3/2019 | Lee et al. | |
| 2019/0094537 A1 | 3/2019 | Choi et al. | |
| 2019/0096121 A1 | 3/2019 | Kang et al. | |
| 2019/0129165 A1 | 5/2019 | Kang et al. | |
| 2019/0130579 A1 | 5/2019 | Heo et al. | |
| 2019/0132581 A1 | 5/2019 | Park et al. | |
| 2019/0162959 A1 | 5/2019 | Lee et al. | |

FOREIGN PATENT DOCUMENTS

| | | |
|---|---|---|
| JP | 2014-155071 A | 8/2014 |
| JP | 5804055 B2 | 11/2015 |
| JP | 5984493 B2 | 9/2016 |
| KR | 10-2018-0057263 A | 5/2018 |

\* cited by examiner $$T^{-1} \cdot S = X$$

METHOD AND APPARATUS FOR RESTORING IMAGE

CROSS-REFERENCE TO RELATED APPLICATION

This application claims priority from Korean Patent Application No. 10-2017-0158646, filed on Nov. 24, 2017 in the Korean Intellectual Property Office, the disclosure of which is incorporated herein by reference in its entirety.

BACKGROUND

1. Field

Methods and apparatuses consistent with exemplary embodiments relate to technology for restoring an image.

2. Description of the Related Art

Due to development of optical technologies and image processing technologies, capturing apparatuses are being utilized in a wide range of fields, for example, multimedia content, security and recognition. For example, a capturing apparatus may be mounted in a mobile device, a camera, a vehicle or a computer, and may be configured to capture an image, to recognize an object or to acquire data to control a device. A volume of a capturing apparatus may be determined based on, for example, a size of a lens, a focal length of a lens or a size of a sensor. For example, the volume of the capturing apparatus may be adjusted based on a size of a lens or a size of a sensor. As the size of the sensor decreases, an amount of light incident on the sensor may decrease. Accordingly, a resolution of an image may decrease, or it may be more difficult to capture an image in a low illuminance environment. To reduce the volume of the capturing apparatus, a multi-lens including small lenses may be used. When the size of the lens decreases, a focal length of the lens may decrease. Accordingly, the volume of the capturing apparatus may be reduced based on the multi-lens.

SUMMARY

One or more exemplary embodiments provide a method and an apparatus for restoring an image.

According to an aspect of an exemplary embodiment, there is provided an apparatus for restoring an image, the apparatus including a plurality of lenses configured to pass a plurality of rays, a sensor including a target sensing element configured to receive a target ray passing a first lens among the plurality of lenses, and a second sensing element configured to receive a second ray passing a second lens among the plurality of lenses, the first lens being different from the second lens; and a processor configured to determine the second sensing element based on a difference between a direction of the target ray and a direction of the second ray, and configured to restore color information corresponding to the target sensing element based on color information detected by the second sensing element.

The processor may be further configured to determine, to be the second sensing element, a sensing element configured to receive the second ray, wherein the difference between the direction of the second ray and the direction of the target ray is less than or equal to a threshold value.

The processor may be further configured to determine, to be the second sensing element, a sensing element configured to receive the second ray, wherein a difference in angle between the direction of the second ray and the direction of the target ray received by the target sensing element is less than or equal to a threshold angle.

The processor may be further configured to determine, to be the second sensing element, a predetermined number of sensing elements in an ascending order of differences in angles between directions of rays received by the predetermined number of sensing elements, respectively, and the direction of the target ray received by the target sensing element.

The processor may be further configured to restore a color image based on the restored color information.

The target sensing element may be configured to detect a color value corresponding to a first color from the target ray received by the target sensing element among the plurality of rays, the second sensing element may be configured to detect a color value corresponding to a second color from the second ray received by the second sensing element among the plurality of rays, the second color differing from the first color, and the processor may be further configured to determine a color value corresponding to the second color associated with a position of the target sensing element based on the color value corresponding to the second color detected by the second sensing element.

The processor may be further configured to determine color information corresponding to a position of the target sensing element based on the color information detected by the second sensing element and color information detected by an adjacent sensing element that is spatially adjacent to the target sensing element.

The processor may be further configured to apply a first weight to the color information detected by the adjacent sensing element and apply a second weight to the color information detected by the second sensing element.

The processor may be further configured to increase a weight applied to the color information detected by the second sensing element as an angle between the direction of the target ray received by the target sensing element and the direction of the second ray received by the second sensing element decreases.

The plurality of lenses may be disposed eccentrically, and are not in a one-to-one correspondence, with respect to the plurality of sensing elements included in the sensor, respectively.

According to an aspect of an exemplary embodiment, there is provided a method of restoring an image, the method including receiving a plurality of rays passing through a plurality of lenses by a sensor including a plurality of sensing elements, selecting a second sensing element configured to receive a second ray passing through a second lens among the plurality of lenses, the second sensing element being different from a target sensing element configured to receive a target ray passing through a first lens among the plurality of lenses based on a direction of the target ray, and restoring color information corresponding to the target sensing element based on color information detected by the second sensing element, wherein the second sensing element is selected based on a difference between a direction of the target ray and a direction of the second ray.

The selecting of the second sensing element may include determining, to be the second sensing element, a sensing element configured to receive the second ray, wherein the difference between the direction of the second ray and the direction of the target ray is less than or equal to a threshold value.

The selecting of the second sensing element may include determining, to be the second sensing element, a sensing element configured to receive the second ray, wherein a difference in angle between the direction of the second ray and the direction of the target ray is less than or equal to a threshold angle.

The selecting of the second sensing element may include determining, to be the second sensing element, a predetermined number of sensing elements in an ascending order of differences in angles between directions of rays received by the predetermined number of sensing elements, respectively, and the direction of the target ray received by the target sensing element.

The method may further include restoring a color image based on the restored color information.

The receiving of the plurality of rays may include detecting a color value corresponding to a first color from the target ray received by the target sensing element among the plurality of rays, and detecting a color value corresponding to a second color from the second ray received by the second sensing element among the plurality of rays, the second color differing from the first color, and wherein the restoring of the color information may include determining a color value corresponding to the second color associated with a position of the target sensing element based on the color value corresponding to the second color detected by the second sensing element.

The restoring of the color information may include determining color information corresponding to a position of the target sensing element based on the color information detected by the second sensing element and color information detected by an adjacent sensing element that is spatially adjacent to the target sensing element.

The determining of the color information may include applying a first weight to the color information detected by the adjacent sensing element and applying a second weight to the color information detected by the second sensing element.

The restoring of the color information may include increasing a weight applied to the color information detected by the second sensing element as an angle between the direction of the target ray received by the target sensing element and the direction of the second ray received by the second sensing element decreases.

A non-transitory computer-readable storage medium storing instructions which is configured to be executed by a processor may cause the processor to perform the method.

According to an aspect of an exemplary embodiment, there is provided an apparatus for restoring an image, the apparatus including a plurality of lenses configured to pass a plurality of rays, a sensor including a target sensing element configured to receive a target ray passing a first lens among the plurality of lenses, and a second sensing element configured to receive a second ray passing a second lens among the plurality of lenses, and a processor configured to determine the second sensing element based on a difference between a viewpoint of the target ray and a viewpoint of the second ray being under a threshold value, and to restore color information corresponding to the target sensing element based on color information detected by the second sensing element.

The processor may be further configured to determine color information corresponding to a position of the target sensing element based on the color information detected by the second sensing element and color information detected by an adjacent sensing element that is spatially adjacent to the target sensing element.

The processor may be further configured to apply a first weight to the color information detected by the adjacent sensing element and apply a second weight to the color information detected by the second sensing element, and may be further configured to increase the second weight applied to the color information detected by the second sensing element and decrease the first weight applied to the color information detected by the adjacent sending element as the difference between the viewpoint of the target ray and the viewpoint of the second ray decreases.

BRIEF DESCRIPTION OF THE DRAWINGS

The above and other aspects will be more apparent and readily appreciated from the following description of exemplary embodiments, taken in conjunction with the accompanying drawings, in which.

DETAILED DESCRIPTION

Figure 1:
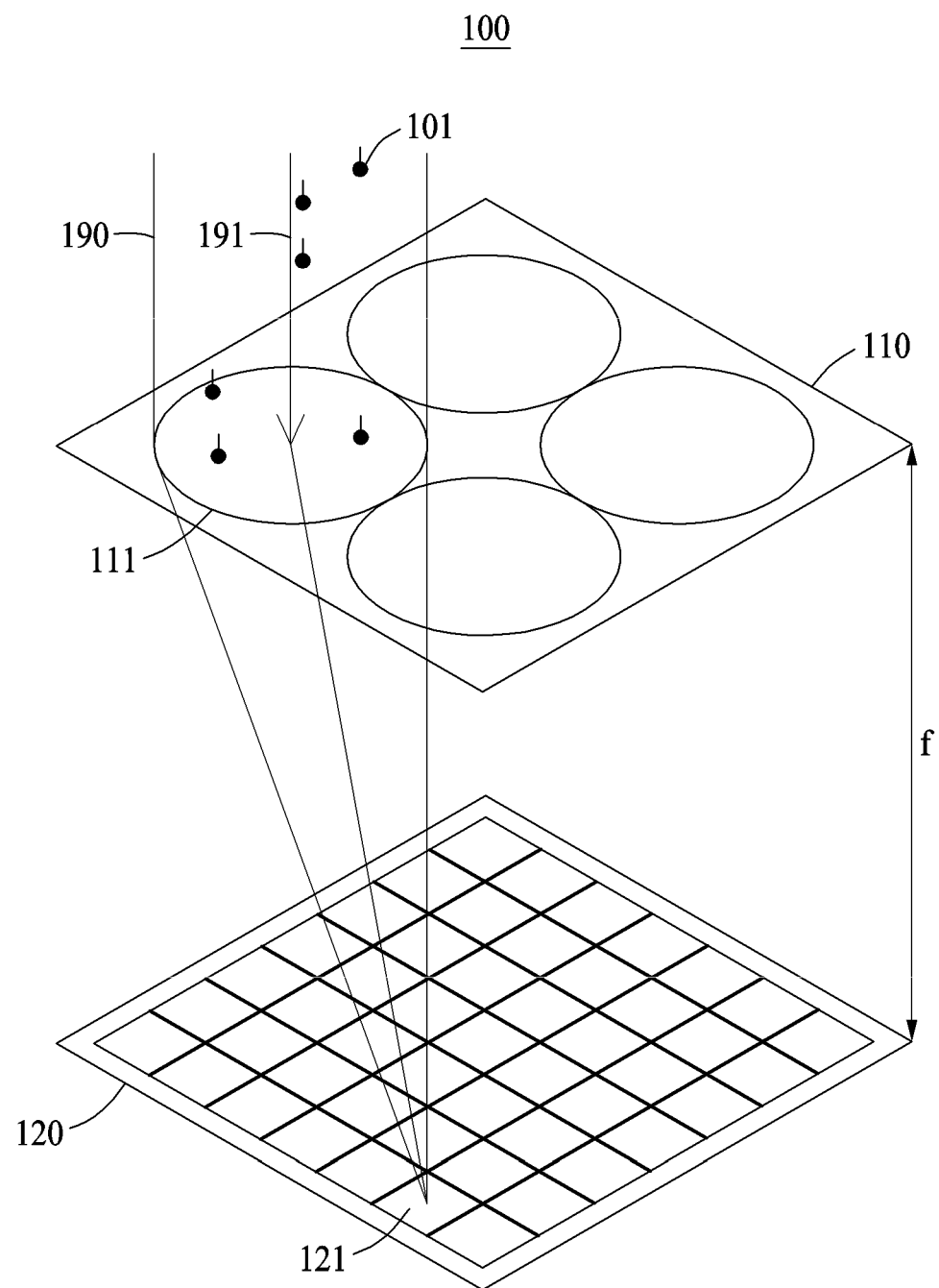
FIG. 1 is a diagram illustrating an image restoration apparatus according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings.

FIG. 1 is a diagram illustrating an image restoration apparatus according to an exemplary embodiment.

A quality of an image captured and restored by an image restoration apparatus 100 may be determined based on a number of sensing elements included in a sensor 120 and an amount of light incident on a sensing element. For example, a resolution of the image may be determined based on the number of the sensing elements included in the sensor 120, and a sensitivity of the image restoration apparatus 100 such as, for example, an ISO of a camera, may be determined based on the amount of light incident on the sensing element. The amount of light incident on the sensing element may be determined based on a size of the sensing element. When the size of the sensing element increases, the amount of light incident on the sensing element and a dynamic range of the sensor 120 may increase. Accordingly, a resolution of an image captured by the sensor 120 may increase as the number of the sensing elements included in the sensor 120 increases. Also, the sensor 120 may operate to improve a sensitivity of the image restoration apparatus 100 even at a low illuminance as a size of a sensing element increases.

A volume of the image restoration apparatus 100 may be determined based on a focal length f of a lens 111. For example, the volume of the image restoration apparatus 100 may be determined based on a gap between the lens 111 and the sensor 120. Because the sensor 120 needs to be located at the focal length f of the lens 111 in order to collect a light 190 refracted by the lens 111, the sensor 120 and the lens 111 included in the image restoration apparatus 100 may need to be spaced apart from each other by the focal length f of the lens 111. The focal length f of the lens 111 may be determined based on a viewing angle of the image restoration apparatus 100 and a size of the lens 111, for example, a radius of an aperture of the lens 111. When the viewing angle is fixed, the focal length f may increase in proportion to the size of the lens 111. Also, the size of the lens 111 may be determined based on a size of the sensor 120. For example, to capture an image within a predetermined range of viewing angles, the size of the lens 111 may need to increase as the size of the sensor 120 increases.

For example, a sensor size may be 6×4 mm, a focal length of a lens array may be about 4 mm, and a field of view (FOV) may be 77 degrees. When the lens size is reduced to ⅒ and the lens array includes 10×10 lenses at the same FOV, the focal length may become 0.4 mm. When the lens size is reduced to ¹⁄₁₀₀, and the lens array includes 100×100 lenses, the focal length may become 0.04 mm.

As described above, to increase a sensitivity of an image restoration apparatus 100 while maintaining a viewing angle and a resolution of the image, the volume of the image restoration apparatus 100 may be increased. For example, to increase a sensitivity of an image restoration apparatus 100 while maintaining a resolution of the image, a size of each of sensing elements included in the sensor 120 may need to increase while maintaining a number of the sensing elements. Accordingly, the size of the sensor 120 may increase. In this example, to maintain the viewing angle, the size of the lens 111 may increase as the size of the sensor 120 increases, and the focal length f of the lens 111 may increase. Thus, the volume of the image restoration apparatus 100 may increase.

To reduce the volume of the image restoration apparatus 100, design schemes of reducing the size of the sensing element while maintaining the resolution of the sensor 120, or of reducing the resolution of the sensor 120 while maintaining the size of the sensing element may be used. In an example, when the size of the sensing element is reduced while maintaining the resolution of the sensor 120, the size of the sensor 120 and the focal length f of the lens 111 may decrease, which may lead to a decrease in the volume of the image restoration apparatus 100. However, in this example, a sensitivity of the image restoration apparatus 100 may also decrease, and a quality of an image under low illuminance may be reduced. In another example, when the resolution of the sensor 120 is reduced while maintaining the size of the sensing element, the size of the sensor 120 and the focal length f of the lens 111 may decrease, which may lead to a decrease in the volume of the image restoration apparatus 100. However, in this example, a resolution of an image may be reduced.

The following example embodiments may provide a technology of reducing the volume of the image restoration apparatus 100 while satisfying a desired viewing angle, a desired resolution, and a desired sensitivity. For example, by reducing the size of the lens 111 while maintaining the size of the sensor 120, the focal length f of the lens 111 may decrease, and a thickness of the image restoration apparatus 100 may also decrease. Referring to FIG. 1, the image restoration apparatus 100 may include a lens array 110 and the sensor 120. The lens array 110 may include lenses, and the sensor 120 may include sensing elements.

When a size of each of the lenses included in the lens array 110 decreases, that is, when a number of lenses included in the same area increases, the focal length f of the lens 111 and the thickness of the image restoration apparatus 100 may decrease. In this example, the image restoration apparatus 100 may restore an original high resolution image by combining low resolution images captured by the lens array 110. Thus, a thinner camera may be implemented by dividing and increasing the number of lenses in the lens array 110.

Each of the lenses, for example, the lens 111 included in the lens array 110 may cover a predetermined area of the sensor 120 corresponding to the size of the lens 111. The light 190 passing through the lens 111 may be incident on sensing elements included in the predetermined area of the sensor 120. The light 190 may include a plurality of rays. A ray 191 may correspond to a flow of a photon 101. Each of the sensing elements in the sensor 120 may generate sensing information based on the ray 191 passing through the lenses included in the lens array 110. For example, the sensing element 121 may generate sensing information based on the ray 191 incident through the lens 111. The image restoration apparatus 100 may determine color information, for example, a color value, which is an intensity value corresponding to an original color signal associated with viewpoints included in a field of view of the image restoration apparatus 100 based on the sensing information output from the sensor 120. Also, the image restoration apparatus 100 may restore a captured image based on the determined color information.

The sensing element 121 may include a color filter to sense a predetermined color. The sensing element 121 may generate a color value corresponding to a predetermined color as sensing information. Each of the sensing elements included in the sensor 120 may be disposed such that an adjacent sensing element spatially adjacent to the corresponding sensing element senses a different color.

When a diversity of sensing information is sufficiently secured and when a full rank relationship between the sensing information and original signal information corresponding to the viewpoints in the field of view of the image restoration apparatus 100 is formed, a captured image corresponding to a maximum resolution of the sensor 120 may be derived. The diversity of sensing information may be secured based on parameters of the image restoration apparatus 100, for example, a number of the lenses in the lens array 110 or a number of the sensing elements in the sensor 120.

Figure 2:
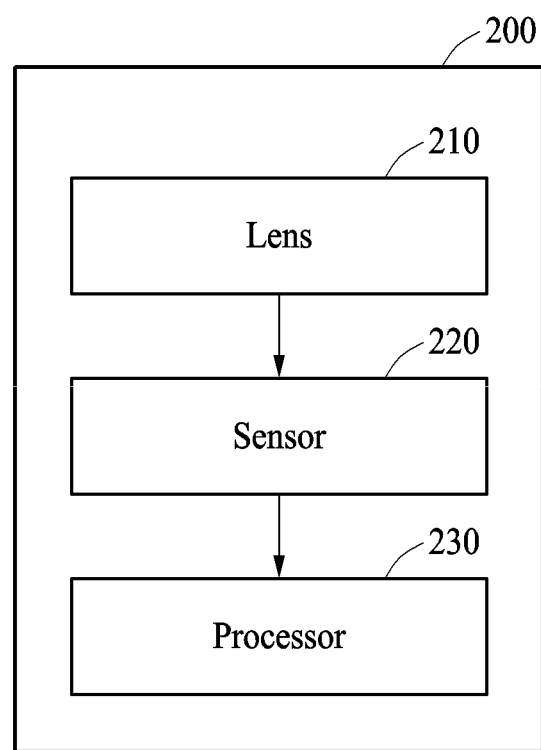
FIG. 2 is a block diagram illustrating an image restoration apparatus according to an exemplary embodiment.

FIG. 2 is a block diagram illustrating an image restoration apparatus according to an exemplary embodiment.

An image restoration apparatus 200 may include a lens 210, a sensor 220, and a processor 230.

As described above, the lens 210 may refract and pass a ray. The lens 210 may be implemented as a lens array including a plurality of lenses 210. The plurality of lenses 210 may be disposed eccentrically, which is not in a one-to-one relationship, with respect to a plurality of sensing elements included in the sensor 220. For example, the plurality of lenses 210 may be arranged relative to the sensor 220 such that each of the sensing elements receives rays corresponding to a plurality of viewpoints. In a top view, the plurality of lenses 210 may be arranged such that a boundary of each of the lenses 210 does not overlap a boundary of each of the sensing elements.

As discussed above, the sensor 220 may generate sensing information based on a ray. The sensor 220 may include a plurality of sensing elements. Each of the sensing elements may generate color information corresponding to a ray received by the corresponding sensing element as sensing information. For example, rays corresponding to a plurality of viewpoints may be incident on a sensing element. The sensing element may generate color information corresponding to the incident rays overlapping each other. According to an exemplary embodiment, color information may include a color value which is an intensity value corresponding to a color to be detected by a sensing element.

The sensor 220 may include a target sensing element that receives a target ray passing through a lens among the plurality of lenses 210 and an other sensing element determined based on a direction of the target ray.

The processor 230 may restore color information corresponding to the target sensing element based on color information detected by the other sensing element. The processor 230 may determine, to be the other sensing element, a sensing element that receives an other ray passing through a lens different from the lens through which the target ray passes and corresponding to a minimum difference in direction in comparison to the direction of the target ray. The processor 230 may restore the color information corresponding to the target sensing element based on the color information detected by the sensing element that receives the other ray corresponding to the minimum difference in direction.

Figure 3:
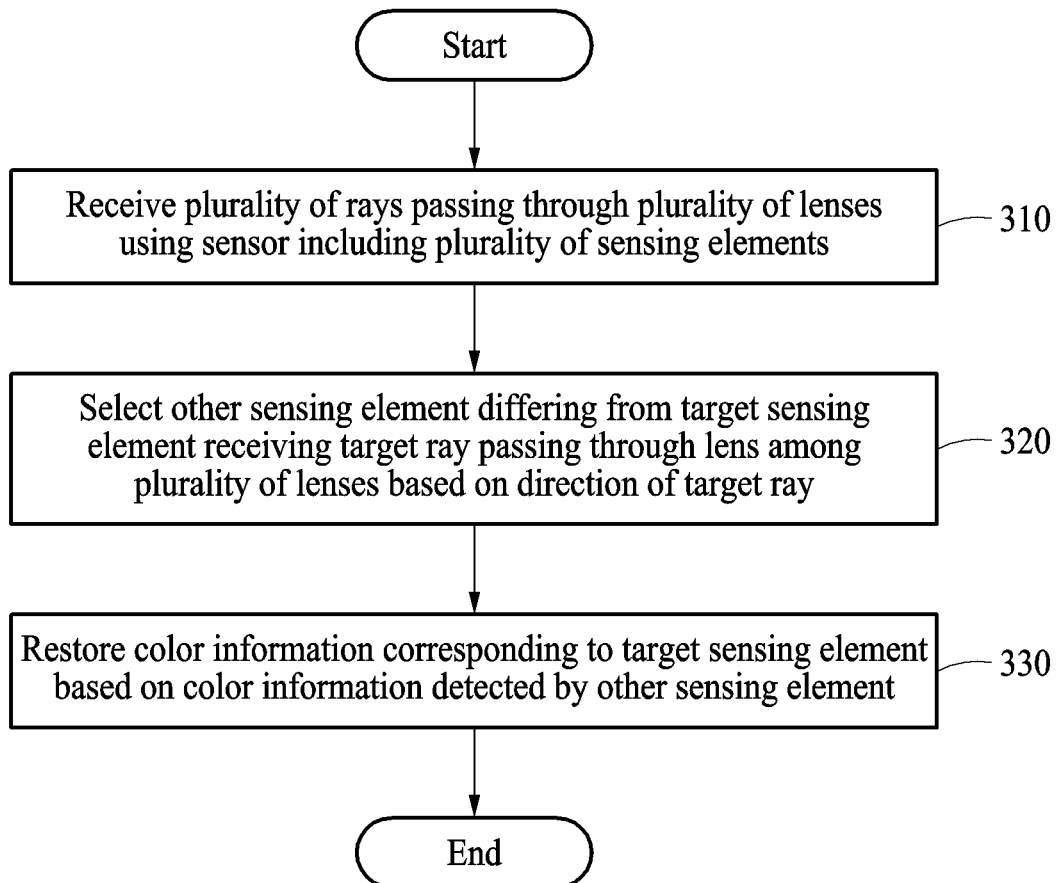
FIG. 3 is a flowchart illustrating an image restoration method according to an exemplary embodiment.

FIG. 3 is a flowchart illustrating an image restoration method according to an exemplary embodiment.

In operation 310, an image restoration apparatus may receive a plurality of rays passing through a plurality of lenses using a sensor including a plurality of sensing elements. For example, a ray corresponding to each of a plurality of viewpoints may be incident on each of sensing elements. Also, a plurality of rays may be incident on a single sensing element.

In operation 320, the image restoration apparatus may select an other sensing element differing from a target sensing element, receiving a target ray passing through a lens among the plurality of lenses, based on a direction of the target ray. The target sensing element may receive a plurality of target rays. The image restoration apparatus may select another target sensing element based on a direction of at least one of the plurality of target rays. In an example, the image restoration apparatus may determine, to be the other sensing element, a sensing element that receives an other ray passing a lens differing from the lens through which the target ray passes in a direction corresponding to a minimum difference from the direction of the target ray. That is, when the subject is at an infinite distance, an other ray may be a ray originating from a viewpoint having a difference less than a predetermined value from the viewpoint of the target ray.

In operation 330, the image restoration apparatus may restore color information corresponding to the target sensing element based on color information detected by the other sensing element. The target sensing element may detect a color value corresponding to a first color from the target ray reaching the target sensing element among the plurality of rays. The other sensing element may detect a color value corresponding to a second color from an other ray reaching the other sensing element among the plurality of rays, the second color differing from the first color. A processor may estimate a color value corresponding to the second color associated with a position of the target sensing element based on the color value corresponding to the second color detected by the other sensing element.

When the target sensing element does not detect a predetermined color, the image restoration apparatus may restore color information corresponding to the target sensing element using a color value detected by the other sensing element disposed at a different position in which the color is to be detected. In this example, the other sensing element may receive a ray having a similar directivity or minimum difference in viewpoint as that of a ray incident on the target sensing element and thus, more accurately estimate a color value of the color that is not detected by the target sensing element.

The image restoration apparatus may generate a sensing information matrix by restoring color information for each of the plurality of sensing elements as described in operation 330. Each element of the sensing information matrix may represent, for example, a color value detected by a sensing element or a color value corresponding to a position in which the sensing element is disposed.

Figure 4:
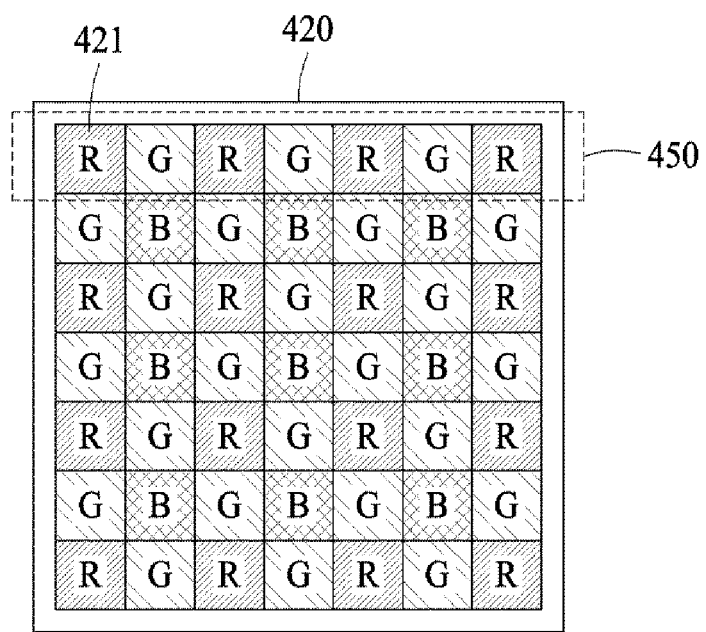
FIG. 4 is a diagram illustrating a sensor including a plurality of sensing elements according to an exemplary embodiment.

FIG. 4 is a diagram illustrating a sensor including a plurality of sensing elements according to an exemplary embodiment.

Referring to FIG. 4, a sensor 420 may include a plurality of sensing elements. The plurality of sensing elements may be arranged on a two-dimensional (2D) plane. Each of the sensing elements may detect an intensity value corresponding to a single color and generate color information. The target sensing element 421 may detect a color value corresponding to a first color, for example, red from a target ray reaching the target sensing element 421 among a plurality of rays. Also, the target sensing element 421 may detect a color value corresponding to a second color, for example, blue or green from an other ray reaching another sensing element among the plurality of rays, the second color differing from the first color.

Each of the sensing elements may detect an intensity value corresponding to one of colors, red, blue, and green in response to a ray being received. In FIG. 4, R denotes a sensing element that detects the red, G denotes a sensing element that detects the green, and B denotes a sensing element that detects the blue. Also, the sensing elements are arranged based on a predetermined pattern. The sensor 420 may include sensing elements arranged based on, for example, a Bayer pattern.

In the sensor 420, a sensing element for detecting the red and a sensing element for detecting the green may be alternately arranged in odd-numbered rows. Also, a sensing element for detecting the green and a sensing element for detecting the blue may be alternately arranged in even-numbered rows. Although FIG. 4 illustrates the sensor 420 including 7×7 sensing elements as an example, exemplary embodiments are not limited thereto.

Each of the sensing elements may detect, but are not limited to, detect the intensity value corresponding to one of the red, the green, and the blue. Each of the sensing elements may also detect an intensity value corresponding to a color included in various color coordinate systems.

For example, a method of restoring color information in each of sensing elements will be described below based on sensing elements arranged in a first row 450. An image restoration apparatus may restore color information of sensing elements arranged in remaining rows in a likewise manner.

Figure 5:
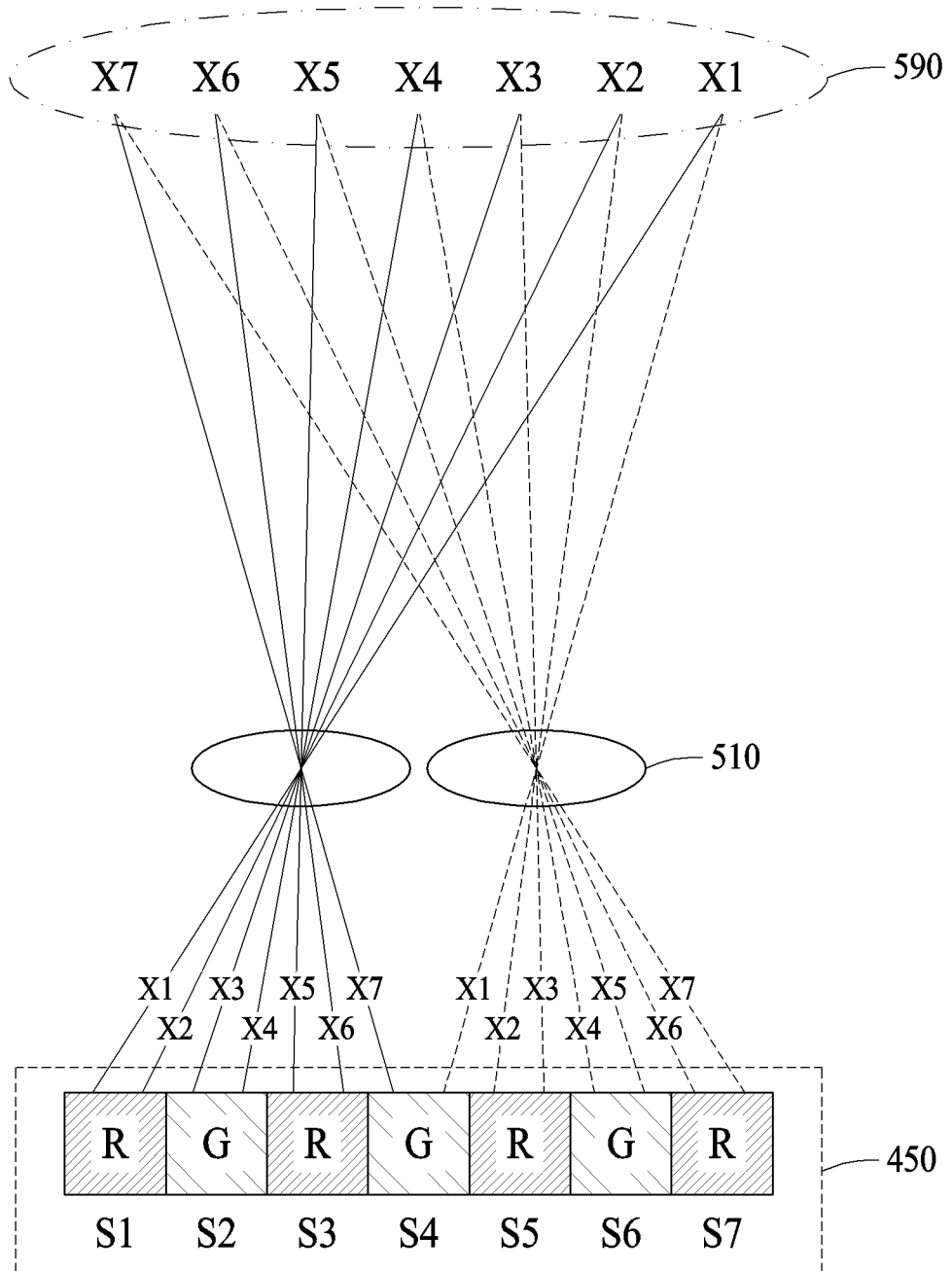
FIG. 5 is a diagram illustrating a sensing element receiving a ray through a lens according to an exemplary embodiment.

FIG. 5 is a diagram illustrating a sensing element that receives a ray through a lens according to an exemplary embodiment.

A sensor may receive rays X1 through X7 corresponding to each of viewpoints 590. The rays X1 through X7 may be detected by a sensor through a lens 510. For example, the description of FIG. 5 will be provided based on sensing elements S1 through S7 corresponding to the first row 450 of the sensor 420 as illustrated in FIG. 4.

The sensing elements S1 through S7 may sense overlapping rays between the rays X1 through X7 overlapping one another and having passed through a plurality of lenses. Referring to FIG. 5, a focal length between the lens 510 and a sensor may decrease for a lens array when the number of lenses included in the lens array increase. The sensing element S1 may generate overlapping sensing information, for example, a color value, of the rays X1 and X2 overlapping each other. An image restoration apparatus may restore the overlapping sensing information to restore an image.

The sensing information generated by the sensing elements S1 through S7 may be modeled to be original signal information, for example, a color value corresponding to a ray incident from each of the viewpoints 590 as shown in Equation 1 below.

$$S = T \cdot X \quad \text{[Equation 1]}$$

In Equation 1, S denotes a matrix indicating sensing information, for example, a detected color value, sensed by each of sensing elements. X denotes a matrix indicating a signal value, for example, a color value of an incident ray, corresponding to a ray incident on the sensing elements S1 through S7 from each viewpoint. T denotes a conversion matrix that represents a relationship between sensing information detected by the sensing elements S1 through S7 and information on a signal corresponding to an incident ray. The rays X1 through X7, the lenses, and the sensing elements S1 through S7 of FIG. 5 may be modeled as shown in Equation 2 below.

$$\begin{bmatrix} S1 \\ S2 \\ S3 \\ S4 \\ S5 \\ S6 \\ S7 \end{bmatrix} = \begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 1 & 0 & 0 & 0 & 0 & 0 & 1 \\ 0 & 1 & 1 & 0 & 0 & 0 & 0 \\ 0 & 0 & 0 & 1 & 1 & 0 & 0 \\ 0 & 0 & 0 & 0 & 0 & 1 & 1 \end{bmatrix} \begin{bmatrix} X1 \\ X2 \\ X3 \\ X4 \\ X5 \\ X6 \\ X7 \end{bmatrix} \quad \text{[Equation 2]}$$

A relationship between the sensing information, for example, color information, corresponding to the sensing elements S1 through S7 configuring a sensor and an original signal, for example, the aforementioned conversion matrix, corresponding to the rays X1 through X7 incident from each of viewpoints may be determined based on an arrangement of the lens 510 and the sensor, the number of lenses included in the lens array, and the number of the sensing elements S1 through S7 included in the sensor.

When an inverse matrix of the conversion matrix T exists, the conversion matrix T may have a full rank. Thus, parameters of a capturing device may be adjusted such that the conversion matrix T has the full rank. Since the conversion matrix T has the inverse matrix, the matrix X indicating the signal information may be calculated by multiplying the inverse matrix of the conversion matrix T by the matrix S indicating the sensing element detected by the sensing element as shown in Equation 3 below.

$$X = T^{-1} \cdot S \quad \text{[Equation 3]}$$

The image restoration apparatus may use a model similar to Equation 3 for each color configuring a color coordinate system. In the example of FIG. 5, relationships between the sensing elements S1 through S7 and the rays X1 through X7 corresponding to the original signal may be modeled with respect to red, green, and blue as shown in Equation 4 below.

$$RX = T_R^{-1} \cdot RS$$

$$GX = T_G^{-1} \cdot GS$$

$$BX = T_B^{-1} \cdot BS \quad \text{[Equation 4]}$$

In Equation 4, RX denotes a color signal matrix indicating a color value of the red corresponding to the rays X1 through X7 incident from each of the viewpoints 590. GX denotes a color signal matrix indicating a color value of the green corresponding to the rays X1 through X7 incident from each of the viewpoints 590. BX denotes a color signal matrix indicating a color value of the blue corresponding to the rays X1 through X7 incident from each of the viewpoints 590. RS, GS, and BS may be sensing information matrixes, for example, a sensing information matrix including color information sensed in each sensing element, indicating the read, the green, and the blue corresponding to positions of the sensing elements S1 through S7 arranged in the sensor. $T_R$, $T_G$, and $T_B$ may be conversion matrixes used to convert color signal matrixes corresponding to the read, the green, and the blue into the sensing information matrixes.

To satisfy the full rank, color values of all colors, for example, the red, the green, and the blue may be sampled for each of the sensing elements. As illustrated in FIG. 5, each of the sensing elements S1 through S7 may detect a color value corresponding to a single color and thus, modeling may be performed as shown in Equation 5 below.

$$\begin{bmatrix} RS1 \\ GS2 \\ RS3 \\ GS4 \\ RS5 \\ GS6 \\ RS7 \end{bmatrix} = \begin{bmatrix} 1 & 1 & 0 & 0 & 0 & 0 & 0 \\ 0 & 0 & 1 & 1 & 0 & 0 & 0 \\ 0 & 0 & 0 & 0 & 1 & 1 & 0 \\ 1 & 0 & 0 & 0 & 0 & 0 & 1 \\ 0 & 1 & 1 & 0 & 0 & 0 & 0 \\ 0 & 0 & 0 & 1 & 1 & 0 & 0 \\ 0 & 0 & 0 & 0 & 0 & 1 & 1 \end{bmatrix} \begin{bmatrix} X1 \\ X2 \\ X3 \\ X4 \\ X5 \\ X6 \\ X7 \end{bmatrix} \quad \text{[Equation 5]}$$

In Equation 5, with respect to an R/G pattern corresponding to the first row 450 of the sensor, RS1, RS3, RS5, and RS7 denote color information, for example, color values detected by the sensing elements S1, S3, S5, and S7 configured to detect the red. GS2, GS4, and GS6 denote color information, for example, color values detected by the sensing elements S2, S4, and S6 configured to detect the green.

Equation 6 shows a result obtained by modeling relationships between the sensing elements S1 through S7 and the rays X1 through X7 with respect to the red using Equation 5.

$RS1=RX1+RX2$ $RS3=RX5+RX6$ $RS5=RX2+RX3$ $RS7=RX6+RX7$ [Equation 6]

In Equation 6, since six items of color information RX1, RX2, RX3, RX5, RX6, and RX7 associated with the red of a signal to be restored and four modeled equations are obtained, the original signal may not be restored through modeling based on Equation 6.

Equation 7 shows relationships between the sensor and the rays of the red obtained using Equation 5.

$GS2=GX3+GX4$ $GS4=GX1+GX7$ $GS6=GX4+GX5$ [Equation 7]

In Equation 7, since five items of color information GX1, GX3, GX4, GX5, and GX7 associated with the green of a signal to be restored and three modeled equations are obtained, the original signal may not be restored through modeling based on Equation 7.

The image restoration apparatus may restore color information of an original signal as follows.

Figure 6:
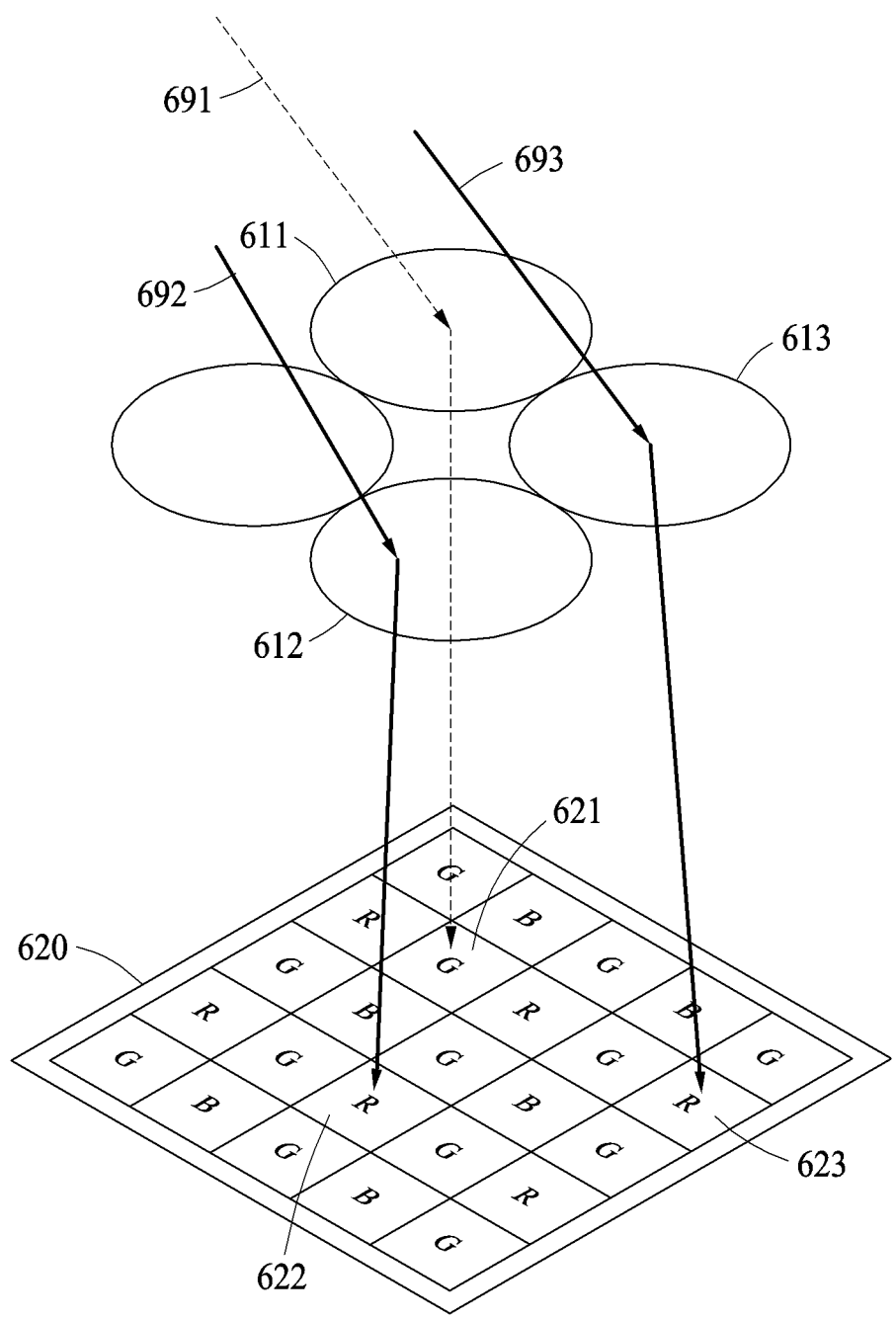
FIG. 6 is a diagram illustrating an example of restoring color information of a target sensing element using a sensing element that receives a ray having passed through another lens according to an exemplary embodiment.

FIG. 6 is a diagram illustrating an example of restoring color information of a target sensing element using a sensing element that receives a ray having passed through another lens according to an exemplary embodiment.

A processor of an image restoration apparatus may determine, to be an other sensing element, a sensing element that receives an other ray passing through a lens differing from a lens through which a target ray passes, in a direction corresponding to a minimum difference from a direction of the target ray.

Referring to FIG. 6, an image restoration apparatus may include a first lens 611, a second lens 612, and a third lens 613, and a sensor 620 including a first sensing element 621, a second sensing element 622, and a third sensing element 623. A first ray 691 may be incident on the first sensing element 621 by passing through the first lens 611. The first sensing element 621 may generate a color value corresponding to green as sensing information. The image restoration apparatus may use color information detected by an other sensing element to estimate a color value of red at a position in which the first sensing element 621 is disposed.

It is assumed that a second ray 692 and a third ray 693 have directions similar to a direction of the first ray 691. The second ray 692 may be incident on the second sensing element 622 by passing through the second lens 612. The third ray 693 may be incident on the third sensing element 623 by passing through the third lens 613. The second sensing element 622 and the third sensing element 623 may generate color values corresponding to the red as sensing information. The image restoration apparatus may restore color information associated with the red of the first sensing element 621 based on color information corresponding to the red detected by the second sensing element 622 and the third sensing element 623 as illustrated in FIG. 6.

The processor of the image restoration apparatus may determine, to be the other sensing element, a sensing element that receives an other ray corresponding to a difference in angle between a direction of the other ray and the direction of the target ray received by the target sensing element being less than or equal to a threshold angle. The threshold angle may vary.

Also, the processor of the image restoration apparatus may determine, to be the other sensing element, a predetermined number of sensing elements in an ascending order of differences in angle between directions of rays received by sensing elements and the direction of the target ray received by the target sensing element. The image restoration apparatus may restore color information of the target sensing element based on color information detected by the sensing elements that receive rays having directions similar to a direction of the ray incident on the target sensing element. The number of sensing elements may vary.

The image restoration apparatus may store mapping information in which sensing elements on which rays are incident in similar directions are mapped to one another. To restore information on a predetermined color, for example, a color that may not be detected by the target sensing element, of the target sensing element, the image restoration apparatus may search for a sensing element capable of detecting the corresponding color based on the mapping information. In this example, the sensing element found based on the mapping information may receive a ray having a similar direction to a ray received by the target sensing element.

When compared to using only adjacent sensing elements spatially adjacent to the target sensing element, the image restoration apparatus may restore more accurate color information using the color information detected by the other sensing element that receives the ray in the similar direction to the ray incident on the target sensing element.

Figure 7:
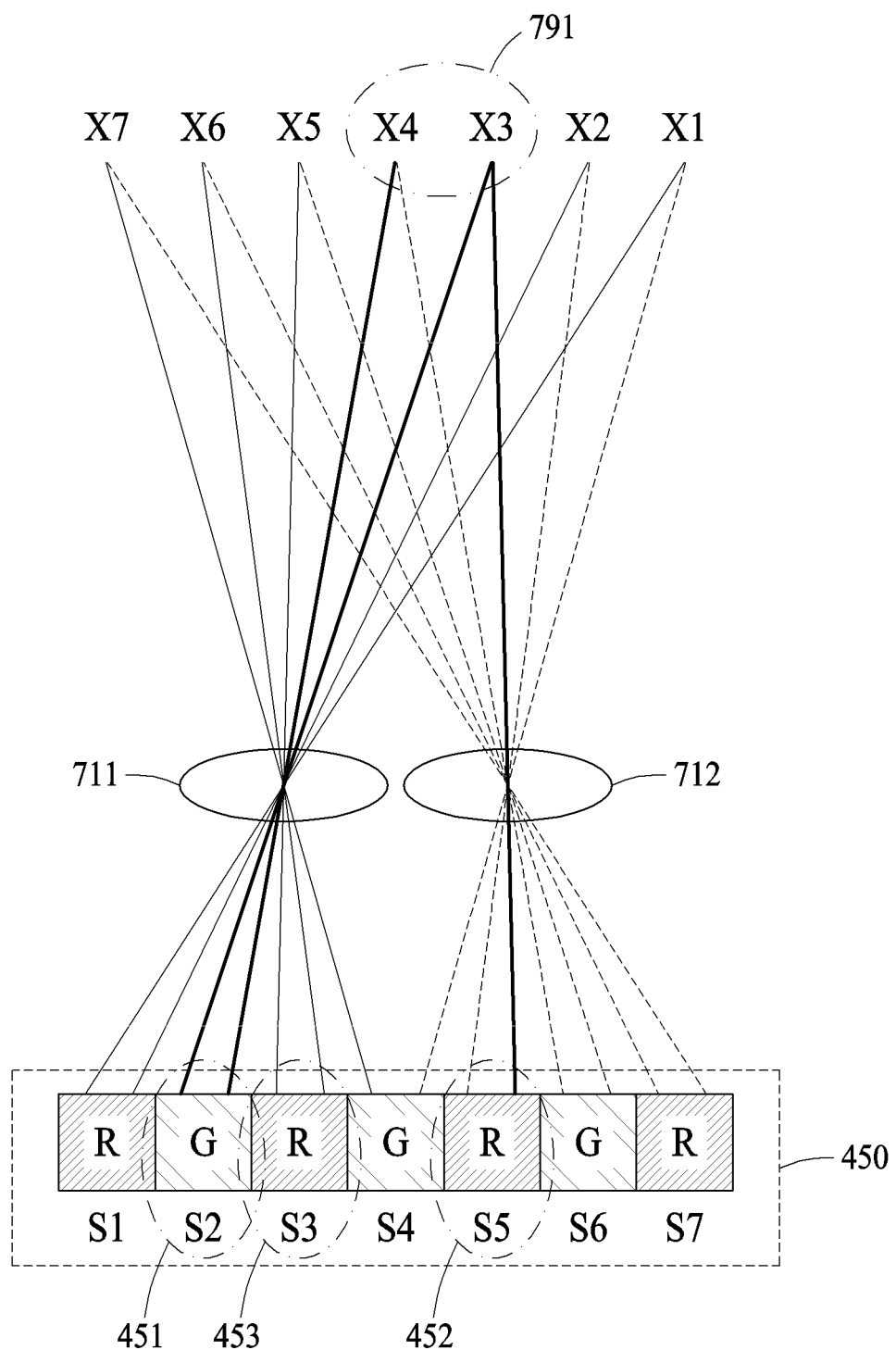
FIG. 7 is a diagram one-dimensionally illustrating a sensing element that receives a ray having a similar directivity to that of a ray received by a target sensing element according to an exemplary embodiment.

FIG. 7 is a diagram one-dimensionally illustrating a sensing element that receives a ray having a similar directivity to that of a ray received by a target sensing element according to an exemplary embodiment.

As described above, to interpolate color information of a target sensing element, an image restoration apparatus may reference an other sensing element that receives a ray having a similar direction to the ray incident on the target sensing element instead of an adjacent sensing element spatially adjacent to the target sensing element. For example, lenses 711 and 712 may be disposed to be slightly eccentrically with respect to the sensing elements S1 through S7. The image restoration apparatus may use color information detected by a sensing element that receives a ray passing through an adjacent lens, thereby improving accuracy of interpolation.

Hereinafter, a process of restoring color information corresponding to red of a second sensing element S2 451 will be described with reference to FIG. 7.

When a first sensing element S1 and a third sensing element S3 453 spatially adjacent to the second sensing element S2 451 are used, red color information of the second sensing element S2 451 may be calculated using "(RS1+RS3)/2". Here, RS1 denotes red color information detected by the first sensing element S1 and RS3 denotes red color information detected by the third sensing element S3 453.

The second sensing element S2 451 may generate sensing information indicating an intensity value of a combination of incident rays 791, for example, the rays X3 and X4. An original red signal corresponding to the second sensing element S2 451 may be expressed as "RX3+RX4", RX3 being a color value corresponding to a red component of the ray X3 and RX4 being a color value corresponding to a red component of the ray X4.

As illustrated in FIG. 7, the ray X3 may be incident on a fifth sensing element S5 452. Thus, instead of the red color information RS1, color information RS5 detected by the fifth sensing element S5 452 may be estimated as sensing information the most similar to the red color information RS2. As such, instead of using simply color information detected by a spatially adjacent sensing element, the image restoration apparatus may use color information detected by an other sensing element that receives a ray having a similar direction to the ray incident on the target sensing element, thereby more accurately restoring a color image.

Also, a processor of the image restoration apparatus may estimate color information corresponding to a position of the target sensing element based on the color information detected by an adjacent sensing element spatially adjacent to the target sensing element and the color information detected by the other sensing element. In this example of FIG. 7, the ray X4 may not be incident on a sensing element configured to detect the red. Thus, the image restoration apparatus may use the color information detected by the adjacent sensing element in addition to the color information detected by the other sensing element.

$$RS2 \approx \alpha \cdot RS5 + (1-\alpha) \cdot RS3 \qquad \text{[Equation 8]}$$
$$\approx \alpha \cdot (RX2 + RX3) + (1-\alpha) \cdot (RX5 + RX6)$$

Equation 8 represents restoration of the red color information of the second sensing element S2 451 performed based on the color information RS5 detected by the fifth sensing element S5 452 and color information, for example, the color value RS3 detected by the third sensing element S3 453. In this example, the second sensing element S2 451 may correspond to the target sensing element, the fifth sensing element S5 452 may correspond to the other sensing element, and the third sensing element S3 453 may correspond to the adjacent sensing element. As illustrated in FIG. 7, the color information RS5 may indicate a color value of a combination of the rays RX2 and RX3 and the color value RS3 may be a color value of a combination of the rays RX5 and RX6.

As shown in Equation 8, the image restoration apparatus may assign a weight to color information detected by each of sensing elements based on, for example, a distance between the other sensing element from the target sensing element, the total number of sensing elements, etc. In an example, the processor may apply a first weight, for example, 1−α to the color information detected by the adjacent sensing element and apply a second weight, for example, α to the color information detected by the other sensing element. The image restoration apparatus may model sensing elements S4 and S6 incapable of detecting the red as shown in Equation 9 below.

$$RS4 \approx \alpha \cdot RS1 + (1-\alpha) \cdot RS7 \qquad \text{[Equation 9]}$$
$$\approx \alpha \cdot (RX1 + RX2) + (1-\alpha) \cdot (RX6 + RX7)$$

$$RS6 \approx \alpha \cdot RS3 + (1-\alpha) \cdot RS5 \qquad \text{[Equation 10]}$$
$$\approx \alpha \cdot (RX5 + RX6) + (1-\alpha) \cdot (RX2 + RX3)$$

The image restoration apparatus may use the color value detected by the other sensing element receiving the ray having the similar direction to the ray incident on the target sensing element to estimate the color value of the target sensing element to be interpolated.

The description of Equations 8 through 10 are based on an example in which the image restoration apparatus references the color information of the other sensing element that receives the ray having the similar directivity to that of the ray of the target sensing element on the same line. However, exemplary embodiments are not limited thereto. For example, the image restoration apparatus may also use color information of a sensing element that receives a ray passing through a lens horizontally or vertically adjacent to a lens through which the ray received by the target sensing element passes on a 2D space.

Equations 8 through 10 are equations for explaining a structure illustrated in FIG. 7, which may be generalized with respect to the red as shown in Equation 11 below.

$$RS_i \approx \sum_{j=1}^{N} \alpha_j \cdot RS_j \qquad \text{[Equation 11]}$$

In Equation 11, $RS_i$ denotes a color value to be restored for an $i^{th}$ target sensing element, $RS_j$ denotes a color value detected by a $j^{th}$ other sensing element, $\alpha_j$ denotes a weight applied to the color value detected by the $j^{th}$ other sensing element, and N denotes a number of other sensing elements that receive rays having directions similar to a direction of a ray received by the $i^{th}$ target sensing element. Likewise, the image restoration apparatus may calculate, for all colors, a weighted average of color information detected by the other sensing element that receives the ray having the similar direction to the ray of the target sensing element using Equation 11.

Also, the processor may apply a higher weight to the color information detected by the other sensing element as a difference in angle between the direction of the target ray received by the target sensing element and the direction of the other ray received by the other sensing element decreases.

Figure 8:
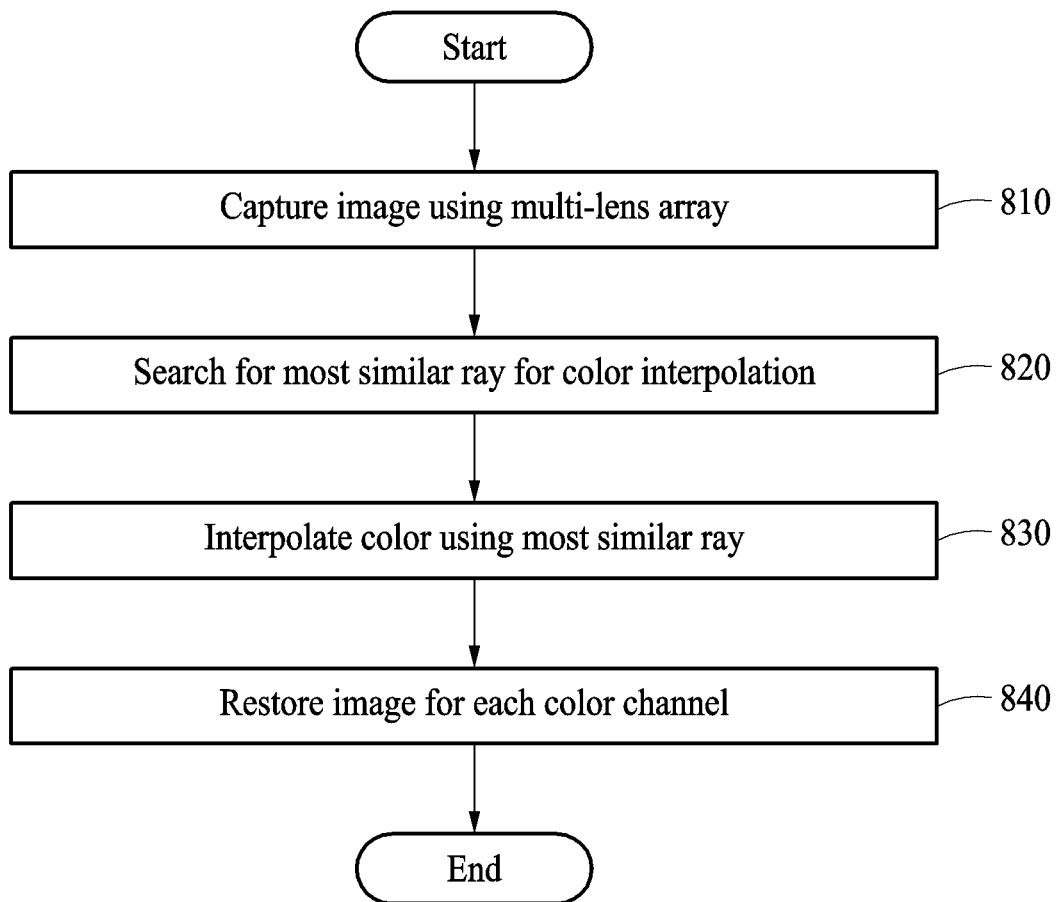
FIG. 8 is a flowchart illustrating an image restoration method according to an exemplary embodiment.

FIG. 8 is a flowchart illustrating an image restoration method according to an exemplary embodiment.

In operation 810, an image restoration apparatus may capture an image using a multi-lens array. The multi-lens array may pass rays. A sensor may generate sensing information indicating a color value corresponding to a color to be detected by each of sensing elements from an incident ray.

In operation 820, the image restoration apparatus may search for a most similar ray for color interpolation. To restore color information of a target sensing element, the image restoration apparatus may select an other sensing element that receives a ray having a similar direction to a ray incident on the target sensing element.

In operation 830, the image restoration apparatus may interpolate a color using a ray having the most similar direction as the ray incident on the target sensing element for the target sensing element. The image restoration apparatus may estimate color information corresponding to the target sensing element based on color information detected by the other sensing element that receives the ray in the similar direction. The image restoration apparatus may restore the color information corresponding to the target sensing element for each of colors configuring a color coordinate system. When the color coordinate system is configured with red, green, and blue (RGB), and when the target sensing element, for example, a sensing element configured to detect the green or the blue, does not detect the red, the image restoration apparatus may estimate a color value of the red corresponding to the target sensing element using an other sensing element configured to detect the red. The image restoration apparatus may determine color information corresponding to the red, the green, and the blue for the target sensing element.

In operation 840, the image restoration apparatus may restore the image for each color channel. For example, a processor of the image restoration apparatus may restore a color image based on the color information restored in operation 830. The image restoration apparatus may restore the color image by combining the color information restored for each of the colors configuring the color coordinate system.

Figure 9:
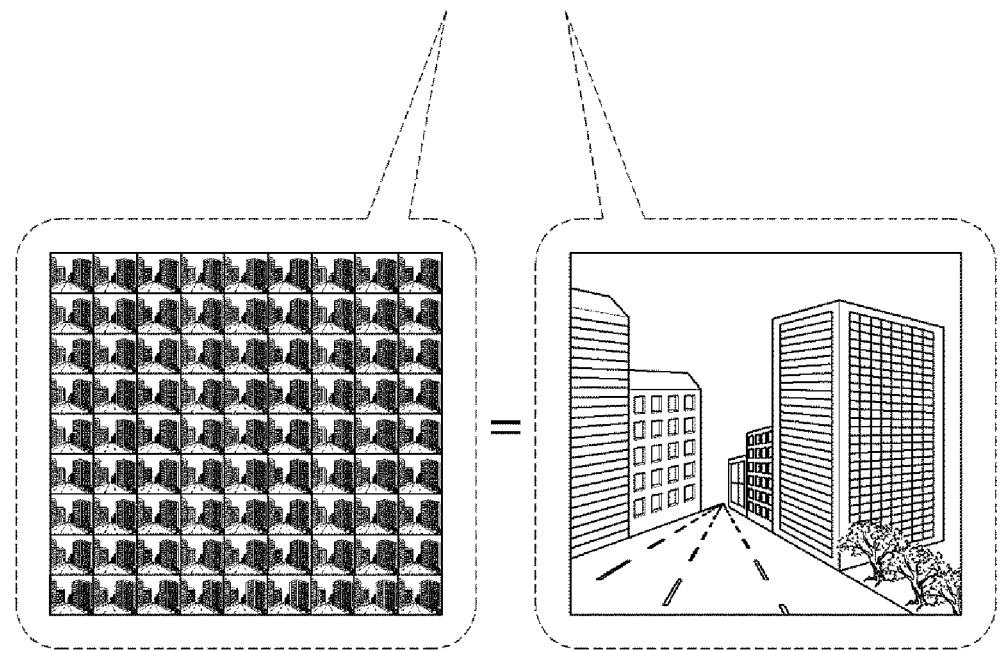
FIG. 9 is a diagram illustrating an example of image restoration according to an exemplary embodiment.

FIG. 9 is a diagram illustrating an example of image restoration according to an exemplary embodiment.

An image restoration apparatus may determine color information of all colors for each of sensing elements included in a sensor by performing the operations described with reference to FIGS. 1 through 7. For example, a color coordinate system may be configured with a first color, a second color, and a third color. In this example, when a predetermined sensing element is configured to detect the first color, the image restoration apparatus may use, for the first color, a color value detected by the sensing element. For the second color or the third color not to be detected by the sensing element, the image restoration apparatus may estimate a color value of a second color or a third color associated with the sensing element based on a color value corresponding to the second color or the third color detected by an other sensing element. The first color through the third color may correspond to the red, the green, and the blue of an RGB system. However, a type of a color coordinate system is not limited thereto.

FIG. 9 illustrates an example in which the image restoration apparatus restores color information corresponding each of sensing elements with respect to a color among colors configuring a color coordinate system. The image restoration apparatus may restore color information of all colors.

As discussed with reference to Equation 3, the original signal X, for example, a color signal corresponding to a predetermined color of FIG. 9 may be estimated based on a matrix product of the sensing information matrix S and an inverse matrix $T^{-1}$ of the conversion matrix. The inverse matrix $T^{-1}$ of the conversion matrix may be determined based on corresponding relationships between sensing elements and viewpoints. The conversion matrix T may be a matrix obtained by modeling a structure in which rays corresponding to a plurality of viewpoints are overlapped and sensed in a single sensing element due to an arrangement of a lens and a sensor. The sensing information matrix S may be sensing information corresponding to each of the sensing elements and may include color information, for example, a color value, detected by each of the sensing elements.

As illustrated in FIG. 9, the image restoration apparatus may restore the original color signal X based on the sensing information matrix S by applying the inverse matrix $T^{-1}$ to the sensing information matrix S. In this example, the inverse matrix $T^{-1}$ may be obtained through an inverse conversion of the conversion matrix based on the corresponding relationships between the sensing elements and the viewpoints. The image restoration apparatus may restore the color information by applying the inverse matrix $T^{-1}$ to the sensing information for each of the colors using Equations 3 and 4 as described with reference to FIG. 9. The image restoration apparatus may restore a color image based on the color information restored for each of the colors.

Figure 10:
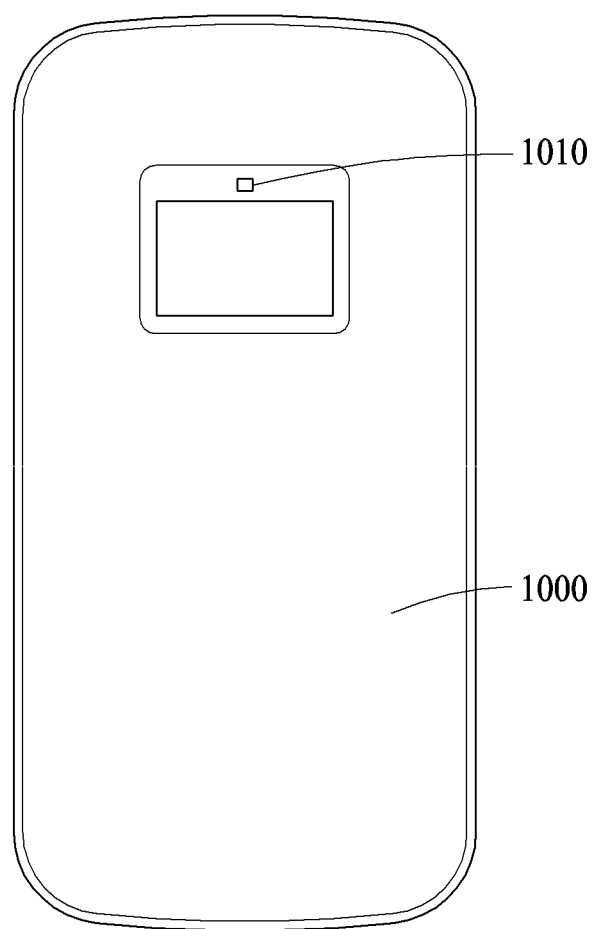
FIGS. 10 and 11 are diagrams illustrating examples of an apparatus in which an image restoration apparatus is to be implemented according to an exemplary embodiment.
Figure 11:
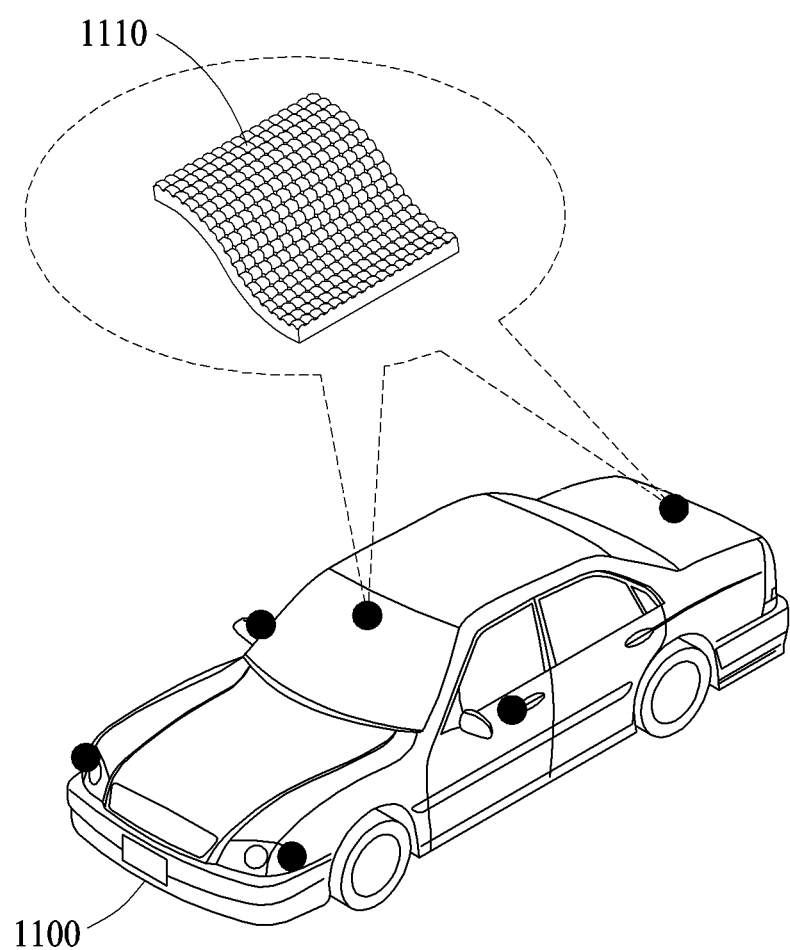

FIGS. 10 and 11 are diagrams illustrating examples of an apparatus in which an image restoration apparatus is implementable according to an exemplary embodiment.

An image restoration apparatus is applicable to various technical fields. The image restoration apparatus may be designed such that a lens array including a plurality of lenses are spaced apart from a sensor including a plurality of sensing elements by a relatively small length. For example, the image restoration apparatus may be implemented as an ultra thin camera with a large sensor for high-definition capturing.

Referring to FIG. 10, an image restoration 1010 may be implemented as a front side camera of a smartphone device 1000. A sensor of the image restoration apparatus 1010 may be implemented as a full-frame sensor. Also, a lens array may be implemented as a micro lens.

Referring to FIG. 11, an image restoration apparatus 1110 may be implemented as a curved camera mounted on a front side or a rear side of a vehicle 1100. However, exemplary embodiments are not limited thereto. The image restoration apparatus may be applicable to, for example, a digital single-lens reflex (DSLR) camera, a drone, a closed-circuit television (CCTV), a webcam camera, a panoramic camera, a movie or broadcast video camera, and a virtual reality/augmented reality (VR/AR) camera. Also, the image restoration apparatus may be applicable to various fields, for example, a flexible/stretchable camera, a compound-eye camera, and a contact lens type camera.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

While one or more example embodiments have been described with reference to the drawings, it will be understood by those of ordinary skill in the art that various changes may be made therein without departing from the spirit and scope of the present disclosure as defined by the following claims.

What is claimed is:

1. An apparatus for restoring an image, the apparatus comprising:
   a plurality of lenses configured to pass a plurality of rays;
   a sensor comprising a target sensing element configured to receive a target ray passing a first lens among the plurality of lenses, and a second sensing element configured to receive a second ray passing a second lens among the plurality of lenses, the first lens being different from the second lens; and
   a processor configured to determine the second sensing element based on a difference between a direction of the target ray and a direction of the second ray, and configured to restore color information corresponding to the target sensing element based on color information detected by the second sensing element.

2. The apparatus of claim 1, wherein the processor is further configured to determine, to be the second sensing element, a sensing element configured to receive the second ray, wherein the difference between the direction of the second ray and the direction of the target ray is less than or equal to a threshold value.

3. The apparatus of claim 1, wherein the processor is further configured to determine, to be the second sensing element, a sensing element configured to receive the second ray, wherein a difference in angle between the direction of the second ray and the direction of the target ray received by the target sensing element is less than or equal to a threshold angle.

4. The apparatus of claim 1, wherein the processor is further configured to determine, to be the second sensing element, a predetermined number of sensing elements in an ascending order of differences in angles between directions of rays received by the predetermined number of sensing elements, respectively, and the direction of the target ray received by the target sensing element.

5. The apparatus of claim 1, wherein the processor is further configured to restore a color image based on the restored color information.

6. The apparatus of claim 1, wherein the target sensing element is configured to detect a color value corresponding to a first color from the target ray received by the target sensing element among the plurality of rays,
   the second sensing element is configured to detect a color value corresponding to a second color from the second ray received by the second sensing element among the plurality of rays, the second color differing from the first color, and
   the processor is further configured to determine a color value corresponding to the second color associated with a position of the target sensing element based on the color value corresponding to the second color detected by the second sensing element.

7. The apparatus of claim 1, wherein the processor is further configured to determine color information corresponding to a position of the target sensing element based on the color information detected by the second sensing element and color information detected by an adjacent sensing element that is spatially adjacent to the target sensing element.

8. The apparatus of claim 7, wherein the processor is further configured to apply a first weight to the color information detected by the adjacent sensing element and apply a second weight to the color information detected by the second sensing element.

9. The apparatus of claim 1, wherein the processor is further configured to increase a weight applied to the color information detected by the second sensing element as an angle between the direction of the target ray received by the target sensing element and the direction of the second ray received by the second sensing element decreases.

10. The apparatus of claim 1, wherein the plurality of lenses are disposed eccentrically, and are not in a one-to-one correspondence, with respect to the plurality of sensing elements included in the sensor, respectively.

11. A method of restoring an image, the method comprising:

receiving a plurality of rays passing through a plurality of lenses by a sensor comprising a plurality of sensing elements;

selecting a second sensing element configured to receive a second ray passing through a second lens among the plurality of lenses, the second sensing element being different from a target sensing element configured to receive a target ray passing through a first lens among the plurality of lenses based on a direction of the target ray; and restoring color information corresponding to the target sensing element based on color information detected by the second sensing element, wherein the second sensing element is selected based on a difference between a direction of the target ray and a direction of the second ray.

12. The method of claim 11, wherein the selecting of the second sensing element comprises determining, to be the second sensing element, a sensing element configured to receive the second ray, wherein the difference between the direction of the second ray and the direction of the target ray is less than or equal to a threshold value.

13. The method of claim 11, wherein the selecting of the second sensing element comprises determining, to be the second sensing element, a sensing element configured to receive the second ray, wherein a difference in angle between the direction of the second ray and the direction of the target ray is less than or equal to a threshold angle.

14. The method of claim 11, wherein the selecting of the second sensing element comprises determining, to be the second sensing element, a predetermined number of sensing elements in an ascending order of differences in angles between directions of rays received by the predetermined number of sensing elements, respectively, and the direction of the target ray received by the target sensing element.

15. The method of claim 11, further comprising:
restoring a color image based on the restored color information.

16. The method of claim 11, wherein the receiving of the plurality of rays comprises:
detecting a color value corresponding to a first color from the target ray received by the target sensing element among the plurality of rays; and
detecting a color value corresponding to a second color from the second ray received by the second sensing element among the plurality of rays, the second color differing from the first color, and
wherein the restoring of the color information comprises:
determining a color value corresponding to the second color associated with a position of the target sensing element based on the color value corresponding to the second color detected by the second sensing element.

17. The method of claim 11, wherein the restoring of the color information comprises determining color information corresponding to a position of the target sensing element based on the color information detected by the second sensing element and color information detected by an adjacent sensing element that is spatially adjacent to the target sensing element.

18. The method of claim 17, wherein the determining of the color information comprises applying a first weight to the color information detected by the adjacent sensing element and applying a second weight to the color information detected by the second sensing element.

19. The method of claim 11, wherein the restoring of the color information comprises increasing a weight applied to the color information detected by the second sensing element as an angle between the direction of the target ray received by the target sensing element and the direction of the second ray received by the second sensing element decreases.

20. A non-transitory computer-readable storage medium storing instructions which is configured to be executed by a processor to cause the processor to perform the method of claim 11.

21. An apparatus for restoring an image, the apparatus comprising:
a plurality of lenses configured to pass a plurality of rays;
a sensor comprising a target sensing element configured to receive a target ray passing a first lens among the plurality of lenses, and a second sensing element configured to receive a second ray passing a second lens among the plurality of lenses; and
a processor configured to determine the second sensing element based on a difference between a viewpoint of the target ray and a viewpoint of the second ray being under a threshold value, and to restore color information corresponding to the target sensing element based on color information detected by the second sensing element.

22. The apparatus of claim 21, wherein the processor is further configured to determine color information corresponding to a position of the target sensing element based on the color information detected by the second sensing element and color information detected by an adjacent sensing element that is spatially adjacent to the target sensing element.

23. The apparatus of claim 22, wherein the processor is further configured to apply a first weight to the color information detected by the adjacent sensing element and apply a second weight to the color information detected by the second sensing element, and
wherein the processor is further configured to increase the second weight applied to the color information detected by the second sensing element and decrease the first weight applied to the color information detected by the adjacent sending element as the difference between the viewpoint of the target ray and the viewpoint of the second ray decreases.

* * * * *